ized Ethylene", *Chemical Engineering*, 12/19/66, pp. 113-120.

United States Patent [19]
Collina et al.

[11] 4,188,470
[45] Feb. 12, 1980

[54] PROCESS FOR POLYMERIZING ETHYLENE IN A GASEOUS PHASE

[75] Inventors: Amilcare Collina, Milan; Arrigo Soverini, Novara; Francesco Rosati, Milan, all of Italy

[73] Assignee: Montedison S.p.A., Milan, Italy

[21] Appl. No.: 868,618

[22] Filed: Jan. 11, 1978

[30] Foreign Application Priority Data

Jan. 12, 1977 [IT] Italy .............................. 19217 A/77

[51] Int. Cl.² .......................... C08F 2/34; C08F 4/02; C08F 10/02
[52] U.S. Cl. ........................................ 526/64; 526/67; 526/68; 526/88; 526/125; 526/352; 526/901; 526/904
[58] Field of Search ..................... 526/64, 67, 68, 88, 526/159, 169, 900, 902

[56] References Cited

U.S. PATENT DOCUMENTS

| | | | |
|---|---|---|---|
| 3,929,754 | 12/1975 | Gloriod et al. ...................... | 526/159 |
| 3,969,332 | 7/1976 | Gloriod et al. ...................... | 526/352 |
| 4,014,859 | 3/1977 | Cooper et al. ...................... | 526/67 |

FOREIGN PATENT DOCUMENTS

| | | | |
|---|---|---|---|
| 828828 | 2/1960 | United Kingdom ...................... | 526/64 |
| 1044305 | 9/1966 | United Kingdom ...................... | 526/64 |

OTHER PUBLICATIONS

Albright, L.F., "High-Pressure Processes for Polymerizing Ethylene", *Chemical Engineering*, 12/19/66, pp. 113-120.

*Primary Examiner*—Edward J. Smith

[57] ABSTRACT

Ethylene is polymerized in a gaseous phase and in contact with a Ziegler/Natta type solid catalyst capable of producing polyethylene in the form of granules having an easily controllable and homogeneous granulometric size, the polymerization being conducted in a tubular reactor in which the catalyst and the polymer granules which are formed are carried along the reactor by the flow of the gas.

6 Claims, No Drawings

PROCESS FOR POLYMERIZING ETHYLENE IN A GASEOUS PHASE

THE PRIOR ART

The liquid phase polymerization of olefins, particularly of ethylene and propylene, in, for instance, hydrocarbons such as hexane, heptane, etc., has had enormous development. However, such processes involve the recovery and recycling of the hydrocarbons used as the liquid polymerization medium.

The recycling imposes economical burdens in the operation of the plant, including heating, cooling, purification, drying, drainage operations, etc.

With a view to overcoming said disadvantages, more advanced technological research has been carried out with the purpose of excluding recycling of the hydrocarbons and allowing the direct polymerization of the olefins in a medium consisting of just one monomer.

That research resulted in the development of processes for polymerizing the olefins in a gaseous phase, some of which processes have been used industrially.

In said processes, the polymerization of the olefin takes place in a fluid bed consisting of particles of the polymer containing the catalyst, and of the gaseous monomer acting as a fluidizing medium. The monomer is cooled down after leaving the reactor and is recycled, thereby achieving, also, the disposal of the great amount of polymerization heat.

In order to operate under the best possible conditions, with suitable difference of temperature between the in-flowing and out-flowing gas, in the more advanced processes referred to hereinabove the conversions of the monomer are kept at 1%-2% per run. A critical feature of those processes is dispersal of the catalyst inside the polymer mass forming the fluid bed, with appropriate feeding devices. The polymer is discharged in the form of a granulate.

In order to obtain a polymer having an acceptable ash content, that is, to achieve high polymer yields, in the processes under discussion, operating at 20-30 kg/cm$^2$ and 80° C.-100° C., the catalyst dwelling time is held to between 4 and 5 hours.

Although said processes are already quite advanced, there are aspects of them which can be considered unfavorable, such as, for instance: long dwelling times, a large amount of monomer recycling, the need for fine regulation of the distribution of the catalyst inside the fluid bed, low flow rates with the risk of agglomeration or the use of stirring or scraping devices, etc.

THE PRESENT INVENTION

One object of this invention is to provide a process for polymerizing olefins in a gaseous phase which process does not have the disadvantages of the known processes and which has significant advantages over the known processes.

This and other objects are accomplished by the present invention in accordance with which ethylene is polymerized, in a gaseous phase, by a process characterized in that the polymerization is conducted in a tubular reactor in which the catalyst and the polymer granules that are formed are carried along the reactor by the flow of the gas consisting of ethylene plus possible other gases such as, for instance, hydrogen used as a molecular weight regulator of the polymer produced. The process is carried out in a way to insure a mean speed of the single, almost equal-sized particles that is not significantly different from the flow rate of the gas and, in any case, is directly proportional to the flow rate of the gas.

The Ziegler/Natta type catalysts used in practicing this invention are obtained by mixing at least one compound of a transition metal which is Ti, V, Zr or Cr with an organo-metallic compound or hydride of a metal belonging to Groups I, II or III of the Mendelyeev Periodic System.

The useful catalysts are those which promote a high initial polymerization speed such as to allow, under the working conditions established in the tubular reactor, a high polymerization yield at least equal to 100,000 g of polymer per g of transition metal, within the first 15 minutes of the polymerization reaction.

Suitable catalysts are in particular the reaction products of an aluminum alkyl compound with a solid catalyst component obtained as combination product of a halogenated Ti compound with a bihalide of Mg, said solid component being characterized in that it has surface area exceeding 3 m$^2$/g and/or in that in its X-rays powder diffraction spectrum instead of the maximum intensity line of the normal Mg bihalide a halo appears whose intensity peak is shifted with respect to the maximum intensity line.

Such catalysts are described, for instance, in Belgian Pat. Nos. 785,332; 785,333; French Pat. Nos. 2,113,313; 2,130,231; German Pat. Nos. 2,504,036; 2,630,585.

It is preferable to introduce, into the reactor, the pre-dispersed catalyst, supported on granules of preformed polymer, in order to allow a regular and uniform dosage distribution and transport along the tubular reactor.

The process according to the invention has the following advantages in comparison with the prior art processes:

(a) an equal dwelling time for each single catalyst particle and therefore a uniformity of characteristics of the polymer, and the possibility of easily controlling this dwelling time by varying the flow rate of the carrier gas;

(b) a wide surface of the reactor involved in the thermal exchange and consequently the possibility of reducing the amount of monomer to be recycled for the disposal of the reaction heat;

(c) lesser distribution problems in the distribution of the catalyst which, introduced into the high turbulence gas flow, reduces the risks of agglomeration which can occur more easily in the fluid beds;

(d) elimination of the problems of carry-over of catalyst with possible polymerization-clogging zones down stream of the reactor;

(e) possibility to maintain diversified temperatures along the reactor axis, thereby achieving a thermal curve that will be adequate for the performance of the catalyst;

(f) possibility of operating at considerably higher pressures, given the more favorable geometrical shape of the reactor;

(g) the possibility to vary the flow rate of the gas-solid mixture in the various zones of the reactor, by varying the cross-section of the tubular conduit; and (h) the possibility of introducing different reactants such as comonomers or molecular weight regulators at various different points of the reactor, thereby achieving a series of different polymerization zones.

A practical embodiment of the process of this invention consists of the following essential steps or phases:

(1) Preparation and feeding of the catalyst.

The catalytic component, based on titanium, of the Ziegler/Natta type having a high yield, in the form of granules or small spheres of $\phi = 5-100\mu$, is treated with an aluminum alkyl in such quantity as to obtain an atomic ratio Al/Ti between 20 and 200, thereafter being diluted or dispersed in preformed polymer, possibly a recycled polymer of a controlled granulometry preferably comprised between 100 and 500$\mu$, in a ratio of from 1:500 to 1:6,000 by weight, depending on the requirements of the dosage.

The product thus obtained is fed into the special dosing-loading tank maintained under a head of an inert gas (or hydrogen) at a pressure greater than the process pressure, in order to hinder the in-flow of monomer and the possibility that it may polymerize, forming clogs. From the doser-loader the catalyst is fed into the monomer stream entering the reactor, by means of a high-speed hydrogen- and/or ethylene flow (1–50 m/sec.).

(2) Polymerization.

The fresh monomer, in an amount equivalent to the production of polymer plus possible bleedings, is fed into the reactor so as to maintain with the re-cycling gas a ratio comprised between 1:5 and 1:50, varying mainly in dependence from the heat exchanged at the reactor wall and the difference of temperature between the inflowing gaseous stream and the stream of gas flowing out of the reactor, as well as with respect to the flow rate of the gas that should be attained in the reactor, in the order of 2–5 m/sec., in order to satisfy the essential requisite of operation, that is, that the mean velocity be equal and controlled for all particles.

The polymerization temperature is comprised between 60° and 120° C., while that of in-flowing gas, i.e., the gas entering the reactor, is comprised between 30° and 60° C. Operating, for instance, at 100 kg/sq.cm in a tubular reactor according to the process of this invention, with a volumetric ratio fresh monomer/recycling gas of 1:15 and $\Delta t$ of gas equal to 30° C., the polymerization heat is disposed of by the gas to the extent of 10–15%, while the remainder is disposed of by heat exchange through the reactor wall, externally cooled by water or by air.

For regulating the molecular weight of the polymer produced there is maintained, in the cycling gas, an amount of hydrogen that varies from 10% to 50% depending, the molecular weight of the polymer produced remaining the same, on the temperature, and, at equal temperature, on the molecular weight that is desired.

The quantity of in-flowing gas must be such as to maintain in the reactor linear flow rates of 2–5 m/sec., suitable, that is, for insuring a good transportation of the solid particles.

The continuous and uniform transportation of polymer particles depends not only on the regularity and continuity of the feeding of catalyst, but also on the proper solid/gas ratio that is necessary to maintain within the range of 2–20 kg/cu.mt. of gas. The best operational ratio within this range is a function of the morphology, the dimensions, the density of the particles as well as the density (pressure, composition) of the carrier gas.

In order to improve the situation at the inlet of the reactor, with reference to the solid/gas ratio, and at the same time improve the mean dwelling time of the catalyst and thus the polymerization yield, it is possible to recycle part of the discharged polymer which may attain 40% of the hourly production.

For instance, operating at 90° C. and a pressure of 30 kg/cm$^2$ with cycling gas at 40% of H$_2$, and producing spheroidal granules of polymer having a diameter comprised between 0.5 and 1.5 mm, with an apparent density of 0.4 g/cm$^3$, there is obtained a regular and smooth transportation of the particles with a solid/gas ratio equal to 5–8 kg/mt$^3$ and a linear flow velocity of the gas at the out-flow of 3 m/sec.

Using the catalysts as described hereinabove, in which the transition metal is Ti, it is possible to obtain yields of the order of 400,000 g polymer/g of Ti, with dwelling times comprised between 6 and 10 minutes, by operating at 90°–95° C. and at a pressure of 80–100 kg/cm$^2$.

(3) Separation of gas from polymer.

At the outlet of the reactor the gas flow plus polymer is conveyed to a cyclone by means of which the solid is separated and then discharged through a double-tank system with valves intended to reduce to a minimum the bleeding of the gas. The gas itself is then sent to a heat exchanger, cooled down to the required thermal level, whereafter it is sent to the recycling compressor from which it is conveyed to the head of the reactor.

Using the process of this invention, the problem of the carry-over of catalyst is avoided. In fact, the catalyst is fully used in the polymerization reaction, thereby eliminating the presence of "fine" substances at the outlet of the reactor.

EXAMPLE

For this test there was used a steel tubular reactor having an inside diameter of 6 mm and a length of 1200 m isolated within a metal container in which was circulated a heat regulating gas. This reactor was inserted into a closed circuit which consisted of a dosing-feeding device for the catalyst, a separator cyclone for the solid/gas separation, a diaphragm compressor and a refrigerating or cooling gas.

The catalyst consisted of co-ground or milled MgCl$_2$+TiCl$_4$, which had been treated with n.trioctyl Al in an Al/Ti ratio of 100. The catalytic complex thus obtained was dispersed on the pre-formed polymer consisting of degassed polyethylene (pretreated with Al-alkyl), of controlled granulometry (0.35–0.5 mm).

The catalyst (0.2 g/hr at 2% of Ti) and the polymeric carrier (1,000 g/hr) were introduced into the gas flowing into the reactor through the dosing-feeding device and by means of the make-up gas flow maintained at a pressure greater than the process pressure. The total gas flowing into the reactor was equal to 11.3 Nm$^3$/hr of fresh ethylene and 80 lt/hr of hydrogen which latter restore also the physical losses of the circuit and of the bleedings.

The operating pressure was maintained at 50 atm. and the temperature was kept at 90°±3° C. The in-flowing gas, at 40% of hydrogen, was maintained at 70° C. while in the heat regulating circuit there was circulated 200 Nm$^3$/hr of air, with a temperature difference of about 10° C.

Under those operating conditions there was obtained 1 kg/hr of polymer in a granular shape (more or less spheroidal, depending on the morphology of the catalyst used) and with an apparent density of 0.4 g/cm$^3$ and an inherent viscosity in tetralin at 135° C. of 1.2 dl/g. The flow rate of the gas was 2.5 m/sec.

Considering the Ti used in the catalyst as equal to 4 mg/hr, there was thus obtained a polymerization equal to 250,000 g of polymer/g of Ti. The monomer conversion, with respect to the total circulating gas, was 7% per run.

What is claimed is:

1. Process for the polymerization of ethylene in a gaseous phase, in a tubular reactor in which the flow of the gas consisting of ethylene or a mixture of ethylene with other gases, and having a flow rate comprised between 2 and 5 m/sec., carries the catalyst and the polymer particles that are formed at a mean velocity about equal for all the particles, the polymerization being conducted in the presence of a catalyst obtained by mixing at least one compound of a transition metal selected from the group consisting of titanium, vanadium, zirconium and chromium, with an organometallic compound or hydride of a metal belonging to Groups I to III of the Mendelyeev Periodic System, and having a starting polymerization speed such that a yield of at least 100,000 g of polymer/g of transition metal is obtained within the first 15 minutes of the polymerization reaction.

2. The process of claim 1, in which the concentration of the solid particles in the gas flow is comprised between 2 and 20 kg/cu.mt.

3. The process of claim 1, in which the catalyst introduced into the reactor is supported on granules of a preformed polymer.

4. The process of claim 3, in which the granules of preformed polymer have a particle size comprised between 100 and 500 microns.

5. The process of claim 1, in which part of the polymer produced is recycled back into the tubular reactor.

6. The process of claim 1, in which the gaseous mixture separated from the polymerization product is recycled back, in whole or in part, to the reactor.

* * * * *